United States Patent [19]

Cornwell et al.

[11] 4,310,486

[45] Jan. 12, 1982

[54] COMPOSITIONS OF CEMENTITIOUS MORTAR, GROUT AND CONCRETE

[76] Inventors: Charles E. Cornwell, 7104 Marlan Dr., Alexandria, Va. 22307; Mark Plunguian, 1515 S. Jeff. Davis Hwy., Arlington, Va. 22202

[21] Appl. No.: 175,667

[22] Filed: Aug. 5, 1980

Related U.S. Application Data

[63] Continuation-in-part of Ser. No. 718,522, Aug. 30, 1976, Pat. No. 4,088,808.

[51] Int. Cl.$^3$ .............................................. B28B 21/44
[52] U.S. Cl. .................................... 264/309; 264/333; 264/338; 106/98; 427/427

[58] Field of Search ....................... 264/338, 309, 333; 106/98; 427/427

[56] References Cited

U.S. PATENT DOCUMENTS

| 3,880,664 | 4/1975 | Schulze | 106/98 X |
| 3,995,086 | 11/1976 | Plunguian | 264/338 X |
| 4,036,839 | 7/1977 | Plunguian | 264/338 X |

Primary Examiner—Thomas P. Pavelko

[57] ABSTRACT

Shaped articles of hydraulic cementitious compositions with aggregates and other components, of mortar, grout, and concrete, are produced by admixing super water reducers and silica fume, the last component being the by-product from the manufacture of metallic silicon and ferrosilicon alloys.

3 Claims, No Drawings

COMPOSITIONS OF CEMENTITIOUS MORTAR, GROUT AND CONCRETE

CROSS REFERENCE TO RELATED APPLICATION

This application is a continuation-in-part of our application Ser. No. 718,522, filed Aug. 30, 1976 now U.S. Pat. No. 4,088,808.

BACKGROUND OF THE INVENTION

The primary object of this invention is to provide hydraulic cementitious compositions which have improved compressive and tensile strength, and improved bonding properties. This improvement is accomplished by the incorporation into the cementitious formulation the pozzolan silica fume. Silica fume is the by-product, now a waste product, obtained during the manufacture of metallic silicon and ferrosilicon alloys. A pozzolan is by definition a product which reacts with lime at room temperature in the presence of water. Lime is generated during curing of the cement. The use of an efficient pozzolan improves the strength, the density, resistance to water penetration in the cured compositions, and insolubilizes the water-soluble calcium hydroxide. Silica fume is an excellent pozzolan and bonding agent due to its physical and chemical properties as described below.

The process of producing metallic silicon consists of feeding a charge of quartz, coal and wood chips to the top of a tall furnace, provided with carbon electrodes extending to the bottom of the furnace. At the high temperature at the bottom, the silicon dioxide is reduced by the carbon to silicon, which melts and is tapped periodically. To produce the ferrosilicon alloys, scrap iron is also added to the charge.

The gaseous by-products are carbon monoxide, which oxidizes to carbon dioxide, and silicon suboxide which oxidizes to silicon dioxide, when the gases reach the top of the furnace. The particulates are the silica fume.

Typical analyses and properties of the submicron silica fume are:

| | |
|---|---|
| $SiO_2$ | 96.09% |
| $Fe_2O_3$ | 0.34% |
| MnO | 0.09% |
| $Al_2O_3$ | 0.21% |
| CaO | 0.35% |
| MgO | 0.23% |
| $K_2O$ | 0.59% |
| $Na_2O$ | 0.07% |
| $SO_3$ | 0.35% |
| loss on ignition | 1.68% |
| Surface area | 25.9 $m^2$/gram |
| Particle size | 0.25–0.02 microns |
| Average particle size | 0.12 microns |
| Bulk density as generated | 4–6 pounds pcf |
| Bulk density (packed) | 12–14 pounds pcf |

The extremely fine particle size and high concentration of silicon dioxide in the fume give it the high reactivity towards lime and thus its effectiveness as a pozzolan. Its presence in the cementitious compositions also greatly improves its bonding properties to aggregates and substrates, thus further increasing the strength properties of the compositions as well as providing an efficient mortar.

SUMMARY OF THE INVENTION

Our application Ser. No. 718,522, now U.S. Pat. No. 4,088,808, describes a process for forming shaped articles of cementitious compositions containing "super" water reducers and pozzolanic fly ash, as well as reinforcing fiber glass fabric or chopped fiber glass. The super water reducers may be selected from the group of polymers consisting of the alkali metal salts of melamine sulfonic acid partially condensed with formaldehyde, the alkali metal salt of naphthalene sulfonic acid partially condensed with formaldehyde ("Lomar D," Diamond Shamrock Chemical Company), and about 30–90 percent of the alkali metal salt of a high molecular weight condensation product of naphthalene sulfonic acid and the balance 70–10 percent being the alkali metal salt of gluconic acid.

It has now been found that the above process can be greatly improved and its usefulness extended by substituting the above described silica fume for the fly ash used previously, as well as by the use of the silica fume along with fly ash.

DETAILED DESCRIPTION OF THE INVENTION

The following specific examples will further illustrate and describe the practice of our invention. The examples are summarized in Table 1. For convenience of comparison the components were recalculated on the basis of 100 parts by weight of the portland cement component (except for examples 9, 10, and 11). The blended dry components were mixed in water, cast into two inch cubes, cured in closed containers for the number of days shown, then dried in air and tested for compressive strength (psi) and for density (pcf).

It may be seen from the results summarized in Table 1 that the substitution of silica fume for fly ash, or the use of silica fume along with fly ash, greatly increases the compressive strength of the grouts and concrete. Examples 1 through 4 show this comparison for grey and white portland cements. Examples 1 and 3 were also applied as a mortar on brick. The mortar bond tests showed separation occuring in the brick rather than the mortar, thus showing that the bond exceeded the strength of the brick. For examples 5 and 6 a graded aggregate was used with an appreciable component of fines. Examples 7 and 8 show the comparison when using a light weight expanded clay aggregate.

TABLE 1

Effects of Silica Fume, Compared to Fly Ash, on the Compressive Strengths of Grouts and Concrete, Determined on Two Inch Cubes

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Grey Portland | 100 | 100 | — | — | 100 | 100 | 100 | 100 | — | — | 25 | 100 | 100 |
| White Portland | — | — | 100 | 100 | — | — | — | — | — | — | — | — | — |
| Lomar D | 1.5 | 1.5 | 1.5 | 1.5 | 1 | 1 | 1.5 | 1.5 | 1.5 | 1 | 1 | 1 | 1 |
| Aragonite Sand | 150 | 150 | — | — | — | — | — | — | — | 100 | 125 | 350 | 350 |

TABLE 1-continued

Effects of Silica Fume, Compared to Fly Ash, on the Compressive Strengths of Grouts and Concrete, Determined on Two Inch Cubes

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Morie Sand | — | — | 150 | 150 | — | — | — | — | — | — | — | — | — |
| 3/8" Quartz Aggregate | — | — | — | — | 450 | 450 | — | — | — | — | — | — | — |
| 3/8" Crushed Trap Rock | — | — | — | — | — | — | — | — | — | — | — | 700 | 700 |
| Expanded Clay (Fine) | — | — | — | — | — | — | 133 | 133 | — | — | — | — | — |
| Silica Fume | 15 | — | 15 | — | — | 20 | 20 | — | — | 30 | 30 | — | 15 |
| Fly Ash | — | 15 | — | 15 | 10 | — | — | 20 | 100 | 70 | 70 | 15 | — |
| Lime | — | — | — | — | — | — | — | — | 30 | 9.2 | 9.2 | — | — |
| Water | 29 | 29 | 30 | 30 | 28 | 28 | 49 | 52 | 53 | 60 | 75 | 77 | 61 |
| Cure (Days) | 28 | 28 | 28 | 28 | 28 | 28 | 28 | 28 | 28 | 28 | 28 | 9 | 9 |
| Density (pcf) | 140 | 140 | 145 | 140 | 131 | 140 | 90 | 95 | 98 | 125 | 114 | 156 | 161 |
| Compressive Strength (psi) | 21,200 | 12,800 | 20,800 | 14,000 | 7,250 | 11,800 | 9,100 | 6,200 | 210 | 730 | 4,900 | 4,800 | 9,600 |

Examples 9, 10, and 11 are unusual in that even in the complete absence of portland cement, but with the addition of lime, a significant strength was obtained with 30% silica fume and 70% fly ash, as compared with 100% fly ash. This strength was very greatly enhanced by admixing only 20% portland cement. Examples 12 and 13 show the effect of silica fume on concrete with very high loading of aggregate. In spite of this high loading, high strength may still be obtained with the use of silica fume. All these formulations show the characteristic glossy surface when cast in a mold with a synthetic polymer glossy release surface. They may also be reinforced with fiber glass scrim or chopped fiber glass and preserve the resulting higher flexural strength thus obtained.

It is obvious that many variations of these compositions may be formulated. We wish to encompass all such applications as come within the scope of the appended claims.

We claim:

1. An improved method of producing shaped articles of cementitious compositions comprising the steps of dispersing in 50-80 parts water about 15-40 parts silica fume, being the particulates from the gaseous by-products obtained during the manufacture of metallic silicon and ferrosilicon alloys, 50-80 parts fly ash, 10-150 parts aggregate, and 0.25-1.5 parts water reducer selected from the groups of polymers consisting of the alkali metal salt of melamine sulfonic acid partially condensed with formaldehyde, the alkali metal salt of naphthalene sulfonic acid partially condensed with formaldehyde, and about 30-90 percent of the alkali metal salt of a high molecular weight condensation product of naphthalene sulfonic acid and the balance 70-10 percent being the alkali metal salt of gluconic acid, all in parts by weight, spraying or casting the composition thus formed in a mold or on a substrate, and allowing the composition to cure.

2. An improved method of producing shaped articles of cementitious compositions comprising the steps of dispersing in 28-70 parts water about 100 parts of an hydraulic cement selected from the group of portland cement and calcium aluminate cement, 50-1100 parts aggregate, 0.25-1.5 parts water reducer selected from the group of polymers consisting of the alkali metal salt of melamine sulfonic acid partially condensed with formaldehyde, the alkali metal salt of naphthalene sulfonic acid partially condensed with formaldehyde, and about 30-90 percent of the alkali metal salt of a high molecular weight condensation product of naphthalene sulfonic acid and the balance 70-10 percent being the alkali metal salt of gluconic acid, where the improvement comprises the step of adding 10-160 parts silica fume, this being the particulates from the gaseous by-products obtained during the manufacture of metallic silicon and ferrosilicon alloys, all in parts by weight, spraying or casting the composition thus formed in a mold or on a substrate and allowing the composition to cure.

3. An improved method of producing shaped articles of cementitious compositions according to claim 2 wherein about 100-140 parts silica fume, along with about 200-300 parts fly ash, and about 20-60 parts lime, all based on 100 parts cement, in parts by weight, are mixed into the aqueous composition.

* * * * *